(12) United States Patent
Gaither et al.

(10) Patent No.: US 10,445,419 B2
(45) Date of Patent: Oct. 15, 2019

(54) FORM FILLING ENGINE TO POPULATE FIELDS OF AN ELECTRONIC FORM

(71) Applicant: Adobe Inc., San Jose, CA (US)

(72) Inventors: Shawn Gaither, Raleigh, NC (US); Richard Treitman, Lexington, MA (US); David Parmenter, Newton, MA (US); Arian Behzadi, San Francisco, CA (US); Kyeung sub Yeom, San Mateo, CA (US); James Alisago, Felton, CA (US); Frederic Thevenet, San Francisco, CA (US); Andres Gonzalez, Wake Forest, NC (US); Anatole Matveief, San Jose, CA (US)

(73) Assignee: Adobe Inc., San Jose, CA (US)

( * ) Notice: Subject to any disclaimer, the term of this patent is extended or adjusted under 35 U.S.C. 154(b) by 234 days.

(21) Appl. No.: 14/988,029

(22) Filed: Jan. 5, 2016

(65) Prior Publication Data
US 2017/0192948 A1    Jul. 6, 2017

(51) Int. Cl.
*G06F 17/24* (2006.01)
*G06F 17/21* (2006.01)
*G06F 9/451* (2018.01)

(52) U.S. Cl.
CPC ............ *G06F 17/243* (2013.01); *G06F 9/453* (2018.02)

(58) Field of Classification Search
CPC ..... G06F 17/243; G06F 17/248; G06F 3/0484
See application file for complete search history.

(56) References Cited

U.S. PATENT DOCUMENTS

| 7,543,228 B2 * | 6/2009 | Kelkar | G06F 17/2247 715/234 |
| 7,814,431 B1 * | 10/2010 | Quinn | G06F 3/0237 715/751 |
| 8,065,602 B2 * | 11/2011 | Campbell | G06Q 30/02 715/224 |

(Continued)

OTHER PUBLICATIONS

Bui, Trung and Martin Rajman, Rapid Dialoge Prototyping Methodology. [online] EPFL Technical Report IC/2004/01, Jan. 5, 2004 [retrieved on Dec. 10, 2015]. Retrieved from the Internet: <URL: http://liawww.epfl.ch/Publications/Archive/Bui2004.pdf>, 17 pages.

(Continued)

*Primary Examiner* — Scott T Baderman
*Assistant Examiner* — Mario M Velez-Lopez
(74) *Attorney, Agent, or Firm* — Kilpatrick Townsend & Stockton LLP

(57) ABSTRACT

Techniques for assisting a user with completing an electronic form via a computing device are described. For example, the user operates the computing device to populate fields of the electronic form. Rather than presenting the electronic form at the computing device in order to populate the fields, a form filling engine reformulates the electronic form into a set of input requests. The form filling engine is local or remote to the computing device. Each input request, when presented, provides guidance about at least one field and solicit a user response that is proper for that field. The form filling engine presents the input requests via the computing device one at a time to solicit the user responses. Data from the user responses are used by the form filling engine to populate the fields of the electronic form.

19 Claims, 8 Drawing Sheets

(56) References Cited

U.S. PATENT DOCUMENTS

| | | | | |
|---|---|---|---|---|
| 9,384,180 B2* | 7/2016 | Piratla | .................. | G06F 17/248 |
| 9,430,455 B2* | 8/2016 | Schuster | ............... | G06F 17/243 |
| 9,727,548 B2* | 8/2017 | Watanabe | ............... | G06F 16/93 |
| 2006/0074652 A1* | 4/2006 | Ativanichayaphong | ..................... | |
| | | | | G06F 17/243 |
| | | | | 704/235 |
| 2008/0215976 A1* | 9/2008 | Bierner | ................ | G06F 17/243 |
| | | | | 715/708 |
| 2009/0204881 A1* | 8/2009 | Murthy | ................ | G06F 17/243 |
| | | | | 715/226 |
| 2010/0211863 A1* | 8/2010 | Jones | .................... | G06F 17/243 |
| | | | | 715/224 |
| 2011/0015929 A1* | 1/2011 | Fantin | .................. | G06F 3/0219 |
| | | | | 704/260 |
| 2013/0117647 A1* | 5/2013 | WeissMalik | ........... | G06Q 10/10 |
| | | | | 715/205 |
| 2013/0198628 A1* | 8/2013 | Ethier | .................. | G06F 3/0484 |
| | | | | 715/709 |
| 2016/0314109 A1* | 10/2016 | Singh | .................. | G06F 17/2229 |
| 2017/0192950 A1 | 7/2017 | Gaither et al. | | |

OTHER PUBLICATIONS

Olympus. [online]. CMU Speech Lab, Feb. 12, 2015 [retrieved on Dec. 10, 2015]. Retrieved from the Internet: <URL: http://wiki.speech.cs.cmu.edu/olympus/index.php/Olympus>, 3 pages.

\* cited by examiner

FORM FILLING ENGINE TO POPULATE FIELDS OF AN ELECTRONIC FORM

TECHNICAL FIELD

This disclosure relates generally to techniques for interacting with an electronic form.

BACKGROUND

Users commonly use computing devices to fill out electronic forms. Electronic forms are of different types, are available from different sources, and are used in different ways. Generally, filling out an electronic form involves operating an application hosted on a computing device to display the electronic form at a graphical user interface. The user is able to view the form and input data to the fields of the form via the application. However, such an application is typically passive in the sense that the application displays the electronic form at the graphical user interface with little, if any, guidance about filling out the electronic form. In certain situations, displaying the electronic form at the user interface can be sub-optimal or even challenging. For example, the smaller the size of the graphical user interface, the less user-friendly the display of the electronic form becomes. Further, accessibility to the electronic form via the application can also be limited. For example, if a user has a physical impairment (e.g., visual) or a manual impairment (e.g., the user driving and unable to type on a smartphone), using the application to fill out the form can become difficult or even impossible.

SUMMARY

One exemplary embodiment involves assisting a user with completing an electronic form via a computing device. In an example, the embodiment involves initiating a form filling engine to assist the user with completing the electronic form. For instance, the form filling engine is initiated based on a request of the user via the computing device to fill out the electronic form. Once initiated, the form filling engine identifies a field of the electronic form. The form filling engine also identifies information for guiding a user response to the field and a valid format for the user response. The information is identified based on a label associated with the field or text associated with the field. The valid format is identified based on a type of the field. The form filling engine generates an input request based on the information for guiding the user response and the valid format of the user response. In addition, the form filling engine presents the input request via the user device. The input request is presented separately from the electronic form. The form filling engine receives the user response based on the presentation of the input request and populates the field of the electronic form with data from the user response.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
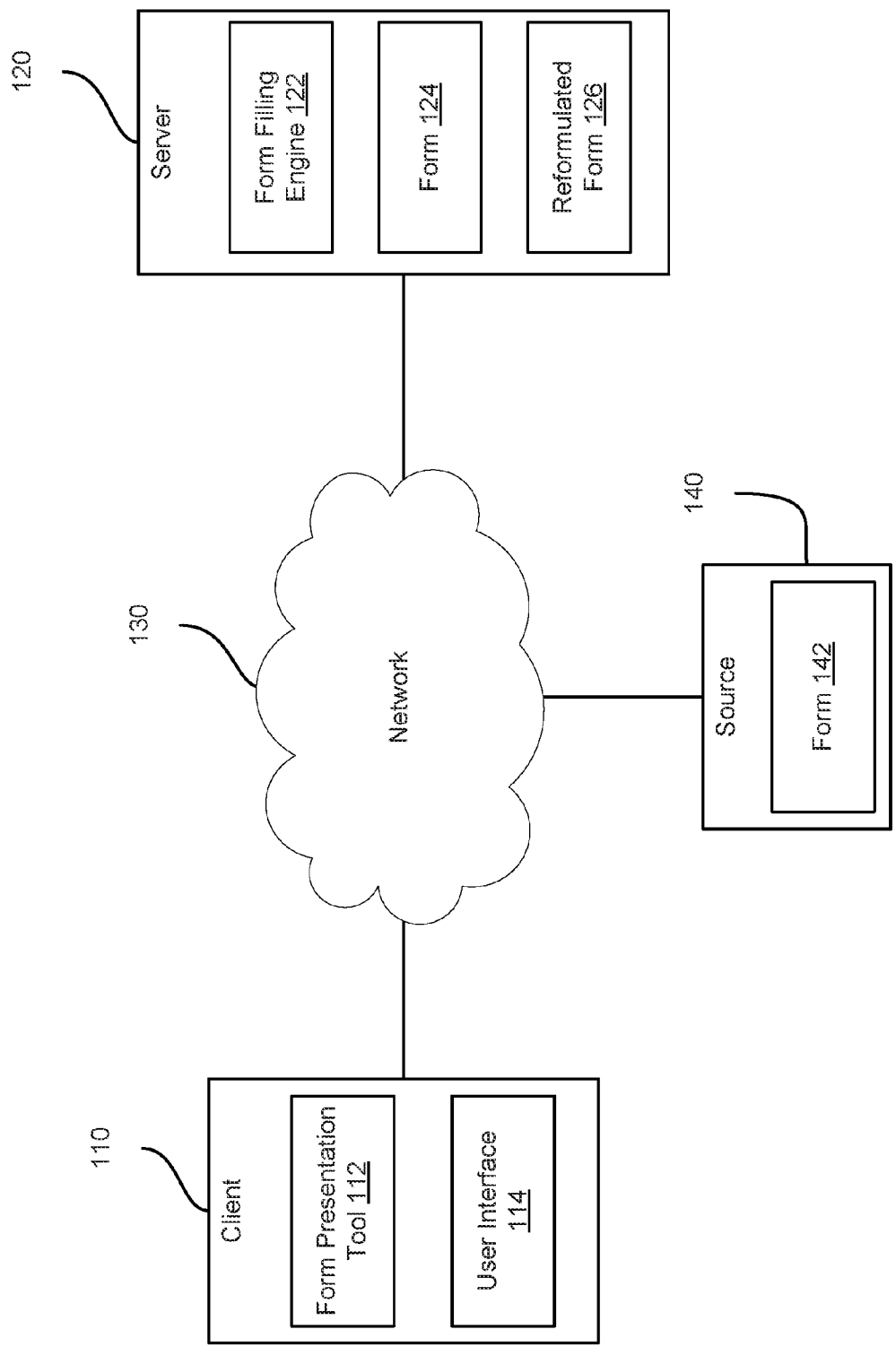
FIG. 1 illustrates an example of a computing environment for accessing an electronic form, according to certain embodiments of the present invention.

Specific details of various exemplary embodiments of the present invention are set forth in the following description and are illustrated in FIGS. 1-8. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, improving accessibility to an electronic form via a computing device. As used herein, an "electronic form" represents a digital form that is stored and manipulated at the computing device. The form includes multiple fields configured to be populated with data based on user input. Specifically, disclosed are methods, systems, and computer readable media that embody techniques for reformulating an electronic form into a set of input requests corresponding to fields of the form. As used herein, an "input request" represents a request to input data into at least one field of the electronic form. For example, a form filling engine reformulates the field of the electronic form into an input request. The form filling engine presents the input request via the computing device. Data from a user response to the input request is used by the form filling engine to populate the field in the electronic form. Rather than presenting the form at the computing device, the form filling engine alternatively or additionally presents the set of input requests in an interactive and guided manner to collect the data and fill out the electronic form in an intelligent manner. As used herein, the phrase "form filling engine" refers to a computer-implemented component or process that assists a user to fill out one or more fields of an electronic form via a computing device. A form filling engine is provided on a server and accessed by a client device in one embodiment. In another embodiment, a form filling engine is provided locally on a client device that the user uses to interact with an electronic form.

To illustrate, consider an example of a medical electronic form. In this example, the electronic form includes different fields such as ones for a first name, a last name, a Social Security number, a date of birth, known prior health conditions, and a signature. In existing systems, such a form is displayed at a graphical user interface of a computing device to collect user input to each field. In comparison, the techniques disclosed herein reformulate the electronic form such that fields of the electronic form are presented one at a time in interactive and guided manner. Different input/output modalities for the presentation can be used including, for instance, an interactive audio presentation at the computing device. As such, the form filling engine asks the user one question at a time using a speaker of the computing device, where each question corresponds to a field. A user response via a microphone of the computing device is used by the form filling engine to populate the corresponding field. Accordingly, the user is asked about his or her first name, last name, Social Security number, and date of birth. In addition, the user is asked about his or her known prior health condition. If none, the form filling engine reads a signature disclaimer to the user and asks the user to sign the electronic form. However, if a prior health condition exists, then prior to signing the electronic form, the form filling engine reads a list of potential health conditions to the user letting the user select a number of these conditions and/or to add other health conditions. Further, if any of the information is already known, the form filling engine reads that information to the user for his or her confirmation thereby saving effort in filling out the medical electronic form.

In an embodiment, the form filling engine is configured to access and analyze an electronic form and, accordingly, identify the fields of the electronic form. This analysis is agnostic of the type or source of the electronic form. As such, any electronic form can be analyzed and used, whether the electronic form has a structure or not and regardless of the source from which the electronic form is available.

In addition, the form filling engine is configured to recognize the label and type of each field and to associate text of the electronic form with each field. Based on a respective label, type, and text, the form filling engine generates an input request for a field. For example, the input request includes the label and the text and identifies a valid format of the user response given the type of field (e.g., how the user response should be collected). For instance, if the field is a radio field with a number of predefined selectable responses, the input request includes the predefined responses and requests the user to select one of them. In comparison, if the field is a text field, the input request allows a freeform user response.

The form filling engine is also configured to organize the input requests for presentation to the user in a particular order. That order generally follows the flow of the electronic form. The flow represents an organization of the fields in the electronic form. In an example, the form filling engine generates and uses a state machine to determine the order. States of the state machine correspond to the fields of the electronic form and, equivalently, to the input requests. Transitions between the states depend on the user responses. In a way, the state machine provides an interactive workflow for presenting the input requests and collecting the user responses. In addition, the input requests provide guided instructions as each includes the label, type, and text of the corresponding field.

By using the state machine and the input requests, the form filling engine facilitates an interactive and guided dialog back and forth with the user to populate the fields of the electronic form. In this way and rather than merely displaying the electronic form to the user, the form filling engine presents (e.g., visually, audibly, etc.) an input request corresponding to a field of the electronic form to the user, where the input request explains what the field is and how to provide a user response. The form filling engine then receives the user response, populates the field with data from the user response, determines the next input request for presentation based on the user response, and so on and forth. Based on the state of the form and the state of the user's information, the states of the state machine can be modified as needed in real-time to reflect the current state of information regarding the user.

Such a form filling engine provides several advantages over existing techniques. For example, any electronic form can be used. Thus, the electronic form can be structured or unstructured. In addition, no pre-processing of the electronic form or pre-mapping between fields and input requests is needed. Instead, the electronic form can be accessed from any source and dynamically analyzed to generate the input requests and the state machine. In another example, the form filling engine provides an interactive and guided dialog rather than being a passive form filling engine that displays the electronic form with little, if any, guidance. In yet another example, the form filling engine can improve accessibility to the electronic form via the computing device. For instance, the form filling engine presents the input requests one at a time using one or a combination of formats (e.g., visible, audible, etc.). Thus, when a display or a graphical user interface of the computing device is too small to properly display the electronic form, the one-at-a-time presentation of the input request overcomes this issue. In another illustration, if the user has a physical or manual impairment, the form filling engine uses an audio for the one-at-a-time presentation and accepts vocal use responses, thereby avoiding the need of the user to view the electronic form and type in data in the fields.

As used herein, the phrase "electronic form" refers to an electronic document for completion by someone filling out the electronic document with information that is expected to be put at specific places on the electronic document. An portable document format (PDF) document with such specific information places is an example of an electronic form. A scanned image of the PDF document is also an example of an electronic form. Typically, an electronic form includes a template of fields and additional information added by one or more persons completing the electronic form. An electronic form will generally provide a way for the persons entering information to enter information in a consistent way so that a receiver of multiple instances of the completed form can read or extract information at particular locations on the electronic form and understand, based on the location, the information. Similarly, the use of fields at particular locations on electronic forms facilitates the interpretation of information entered onto the forms. An electronic form may, for example, have a name field and a recipient or analysis application may understand based on the location of the text added to the electronic form by a person completing the electronic form that the added text is the name of the person. The template of an electronic form can specify fields and field characteristics.

As used herein, the phrase "field" refers to a location in an electronic form or a portion of a form at which one or more items of information are entered when the electronic form is completed. Text boxes, Boolean graphics such as checkboxes, and signatures are examples of fields. A field has one or more field characteristics. Fields can be defined explicitly and identified expressly, for example, using metadata in the form. Fields that are not defined can be inferred, for example, using a recognition algorithm that uses appearance of certain graphical objects (lines, rectangles, circle, radio buttons, checkboxes, etc.) to identify locations as candidate fields where information is to be entered when the form is completed.

As used herein, the phrase "separate" refers to being distinct from. A presentation is separate from an electronic form refers to the presentation being distinct from the electronic form. For example, the presentation is stored separately from the electronic form and/or is presented (e.g., displayed at a graphical user interface) separately from the electronic form.

Turning to FIG. 1, the figure illustrates an example environment for providing a guided experience to fill out an electronic form via a computing device. In particular, a client 110 and a server 120 are in communication over a data network 130 to fill out the electronic form. The electronic form is available from different sources including, for example, a source 140. The client 110 sends a request to the server 120 to fill out the electronic form. In response, the server 120 accesses the electronic form from the source 140, reformulates the electronic form into a set of input requests, and guides the presentation of the input requests at the client 110. In turn, the client 110 presents the input requests to a user using different input/output modalities, such as ones using text and voice based presentations or touch presentations via Braille machines. In an example, the input requests are presented in lieu of the electronic form for the purpose of filling out the electronic form. The presentation of each input request is a guided presentation in the sense that guidance to the user is provided to solicit the appropriate user response. For example, an input request corresponds to a field of the electronic form, includes a label of the field and text describing the field. The guided presentation of this input request presents the label and the text and requests a user response. User responses to the presentation of the input requests are received at the client 110 and provided to the server 120. The server 120 populates the fields of the electronic form with data from the user responses and saves the filled out electronic form.

Although the example computing environment of FIG. 1 illustrates a client-server architecture, the embodiments described herein are not limited as such. The embodiments similarly apply to other distributed and non-distributed architectures. For example, some the functionalities of the server 120 can be pushed to the client 110. In other words, the server 120 need not be used. Instead, all of the processing can be local to the client 110. In another example, the source 140 storing the electronic form can be local to the client 110 and/or the server 120.

The network 130 represents a data network that includes, for example, a public network (e.g., the Internet) and/or a private network (e.g., an intranet, a local area network, etc.). The source 140 represents a storage space where the electronic form 142 resides. In an example, the storage space is accessible to the client 110 and/or the server 120 over the network 130. Such a storage space includes a server hosting an email inbox of the user, a server hosting a web site, and a network-based storage space (e.g., public or private cloud storage). In another example, the storage space is local to the client 110 and/or the server 120. For instance, disk of the client 110 and/or the server 120 can be part of the source 140.

Turning to the computing components of the server 120, these components include, for example, a form filling engine 122, an electronic form 124, and a reformulated electronic form 126. In an example, the form filling engine 122 retrieves an electronic form 142 from the source 140 and locally stores the retrieved electronic form 142 as the electronic form 124 for analysis. Typically, the form filling engine 122 retrieves, stores, and analyzes an electronic form after a request of the client 110 for the electronic form. In other words, the form filling engine 122 dynamically handles and need not pre-process the electronic form. As such, the electronic can be of any type, whether structured or not, and retrieved from any source. In addition, no pre-mapping of fields of the electronic form to input requests are needed.

Further, the form filling engine 122 analyzes the electronic form 124 to generate the reformulated electronic form 126. For example, the form filling engine 122 identifies fields within the electronic form 124. These fields can be explicit when the electronic form 124 has a structure. In an illustration, if the electronic form 122 is a portable document format (PDF) form, the layout of such form encapsulates the different explicit fields. The form filling engine 122 detects the fields from the layout. These fields can also be implicit when the electronic form 124 does not have a structure. For example, if the electronic form 122 is a scanned image, the form filling engine 122 applies optical character recognition (OCR) and pattern recognition techniques to detect the implicit fields. Once the fields are identified, the form filling engine 122 also identifies the label and the text describing each field from the electronic form 124 as applicable. The form filling engine 122 generates input requests corresponding to the fields based on the labels and the texts. Generally, an input request corresponding to a field(s) includes the label(s) of the field(s) and the text(s) describing the field(s). Different mapping types between fields and input requests can be used. For example, a one-to-one mapping is available, where each field is mapped to one input request. In an illustration, a field for a date of birth and a field for a Social Security number are mapped to an input request for the date of birth and an input request for the Social Security number, respectively. A many-to-one mapping is also available, where multiple fields are mapped to one input request. In this mapping, a group of fields are mapped to a single input request based on a degree of associations between the fields of the group. In an illustration, a field for a first name and a field for a last name are mapped to an input request for a full name. The form filling engine 122 saves the input requests as the reformulated form 126.

Figure 2:
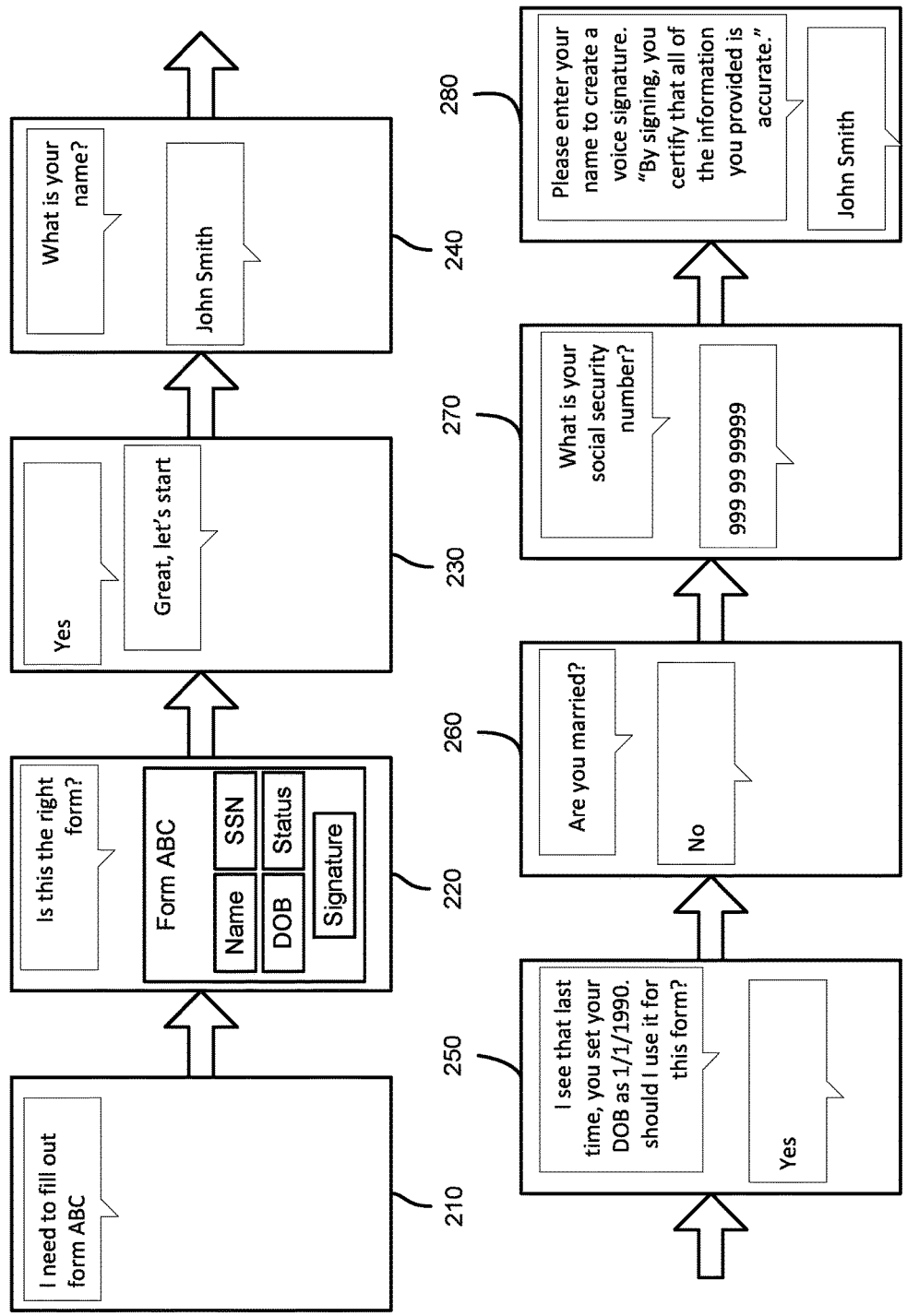
FIG. 2 illustrates an example interactive and guided dialog to fill out an electronic form, according to certain embodiments of the present invention.

Upon generating the reformulated form 126, the form filling engine 122 also generates a guided presentation for presenting the different input requests of the reformulated form 126 at the client 110. An example of presenting the guided presentation at the client 110 is illustrated in FIG. 2. Generally, the guided presentation presents one input request at a time based on associated label(s) and text(s) and solicits a user response thereto. As such, rather than presenting the entire electronic form 124 at the client 110 and necessitating a user to figure out how to populate the different fields, the guided presentation guides the user by presenting an input request, describing the corresponding field(s), and requesting input of the user.

In an example, the form filling engine 126 generates the guided presentation based on a state machine corresponding to the electronic form 124. An example state machine is further illustrated in FIG. 3. Generally, the form filling engine 126 generates the state machine from the identified fields of the electronic form 124 and the flow, including the order or sequence, of these fields in the electronic form 124. Each state of the state machine corresponds to an input request. Transitions between the states reflects the flow. A transition between a first state to a second state depends on a user response to an input request corresponding to the first state.

The server 120 transmits the guided presentation to the client 110 for presentation. User responses to the input requests are received from the client 110. The form filling engine uses the user responses to populate the fields and, accordingly, fill out the electronic form 124. If the electronic form 124 includes structured fields, data from the user's responses are inputted to the respective fields. On the other hand, if the electronic form 124 includes implicit fields, each field can be associated with metadata by using, for example, tags. The form filling engine 122 generates the respective metadata from data of the user responses.

Turning to the computing components of the client 110, these components include, for example, a form presentation tool 112 and a user interface 114. In an example, the form presentation tool 112 represents an interface to the form filling engine 122 of the server 120. In particular, the form presentation tool 112 receives the guided presentation generated by the form filling engine 122, presents the guided presentation at the user interface 114, receives user responses thereto at the user interface, and provides the user responses to the form filling engine 122. The user interface 114 represents an interface for presenting the guided presentation and receiving the user responses according to one or more input/output modalities. The user interface 114 includes, for example, a graphical user interface for displaying the guided presentation and a hard or soft keyboard for receiving typed user responses. Additionally, or alternatively, the user interface 114 includes an audio interface for providing an audio presentation receiving speech responses.

As explained herein above, the embodiments described herein are not limited to the client-server architecture illustrated in FIG. 1. For example, some or all of the functionalities of the server 120 can be pushed to the client 110. In an illustration, the form presentation tool 112 represents an instance of, rather than an interface to, the form filling engine 122. In another illustration, the electronic form 124 is stored on the client 110 and is provided to the server 120, depending on the architecture, for analysis. In yet another illustration, the client 110 receives and stores the reformulated electronic form 126 from the server 120 and locally generated the guided presentation based on stored reformulated electronic form. In yet another example, user information are stored at the client 110, at the server 120, and/or a database accessible to the client 110 and/or server 120. The user information forms a profile of the user. For example, some of the user information includes personal information, such as the user's name, date of birth, last four digitals of the Social Security number, etc. The form filling engine 122 and/or the form presentation tool 112 can use the user information, including the personal information, to pre-populate applicable fields of an electronic form or to generate a set of potential answers for presentation as a part of the guided presentation, thereby allowing a user selection of a potential answer. These are illustrative examples. Other variations of the distributed architecture between the client 110 and the server 120 are also possible and should be apparent to one of ordinary skill in the art in light of the embodiments described herein.

Hence, the components of the server 120 allows the dynamic processing of an electronic form of any structure and from any source to generate a reformulated electronic form. The reformulated electronic form includes a set of input requests mapped to a state machine. The input request and the state machine allows a guided presentation about the fields of the electronic form at the client 110. User responses are then used to populate the fields of the electronic form.

Turning to FIG. 2, the figure illustrates a guided presentation displayed at a client to fill out an electronic form. As displayed, the guided presentation includes input requests to solicit user responses. A user inputs the user responses to the guided presentation at the client 110. The displayed input requests and inputted user responses represent a guided dialog. In the interest of clarity of explanation, a form presentation tool is described in connection with facilitating the guided dialog at a user interface of the client. The user interface implements a input/output modality in the form of a text messenger. However, other computing components and input/output modalities can be additionally, or alternatively, used. In addition, the illustrated electronic form includes five fields: a name field, a Social Security number field, a date of birth field, a status field, and a signature field. However, another number and type of fields can also be used.

In a first interaction 210, the form presentation tool receives a request to fill out the electronic form. The form presentation tool identifies and accesses the electronic form by, for example, interfacing with a form filling engine hosted on a remote server. In response and as a part 220 of the guided presentation, the form presentation tool displays a graphical representation of the electronic form, such as a thumbnail representing the electronic form, and asks the user whether the right electronic form was accessed. The user response confirms. In turn and as a part 230 of the guided presentation, the form presentation tool explains that the fill out process will start.

Corresponding to the first field of the electronic form (e.g., the name field), the form presentation tool asks the user to input his or her first name, as a part 240 of the guided presentation, the form presentation tool asks the user to input his or her first name in association with the first field of the electronic form (e.g., the name field). The form presentation tool receives and provides the user response to the form analysis for populating the name field. Once that field is populated, the guided presentation proceeds to the next field corresponding to the date of birth.

As illustrated, the user previously provided the date of birth in connection with filling out a different electronic form. A prediction is made that the same date of birth can be used for the current electronic form. Accordingly, and as a part 250 of the guided presentation, the form presentation tool explains to the user that the date of birth was predicted and requests a confirmation of the user. Upon a confirmation of the user, the date of birth field is populated and the guided presentation proceeds to the next field corresponding to the status.

Here, the electronic form includes two options for filling out the status field. A first option of being married. A second option of being unmarried. As a part 260 of the guided presentation, the form presentation tool asks the user if he or she is married. The answer is no. Accordingly, the second option (unmarried) is automatically selected to populate the status field. Next, the guided presentation proceeds to the Social Security number field.

As a part 270 of the guided presentation, the form presentation tool asks the user for his or her Social Security number. If the user responds with a text answer, that answer is invalidated because a numeric answer is expected. The user is then asked again for the Social Security number. If the user responds with a numeric answer, the Social Security number field is populated with the different numbers (or, the last four digitals of the Social Security number are only used rather for security reasons and personal privacy). The guided presentation proceeds to the last field. This last field is a signature field and is associated with a legal disclaimer.

As a part 280 of the guided presentation, the form presentation tool reads the legal disclaimer and asks the user to enter his or her name as a form of the signature. The entered name is used to populate this last field. The electronic form is then automatically saved to complete the fill-out process.

In comparison, existing techniques typically display the electronic form to the user and provides no guidance for populating each field. Instead, it is left to the user to navigate through the fields. This navigation can become cumbersome when the user interface is small in size and/or when the user has some impairment. Alternatively, the guided presentation of the embodiments described herein presents an input request corresponding to a field and guides the user to provide an input. Such a guided presentation improves the accessibility to the electronic form via the client even when the user interface is small and when the user has some impairment.

Figure 3:
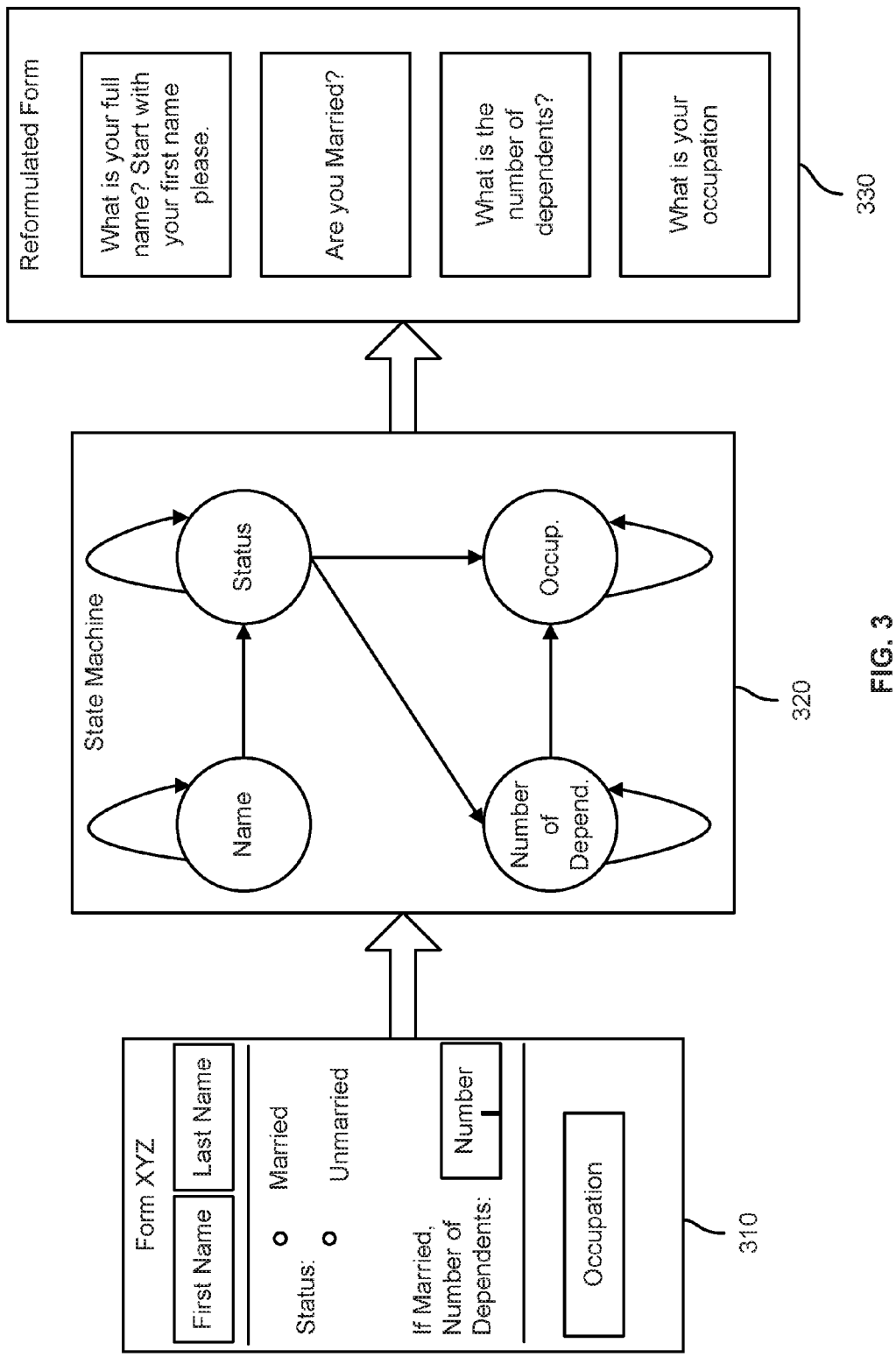
FIG. 3 illustrates an example state machine corresponding to an electronic form, according to certain embodiments of the present invention.

To provide the guided presentation, the electronic form is mapped to a state machine. Each part of the guided presentation (e.g., the parts 220-280) are presented based on the state machine and based on the user response to the previous part. FIG. 3 illustrates an example state machine. In an example, the state machine is generated by the form filling engine based on an analysis of the electronic form.

In particular, an electronic form 310 is mapped to a state machine to generate a reformulated form 330. As illustrated, the electronic form 310 includes fields of different types, such as text, radio, comb, checkbox, signature, list, image, and other types of fields. These fields are organized according to a particular flow. For example, related fields are grouped in the same sections, and related sections are arranged to form adjoining sections.

The form filling engine identifies the fields and the types, labels, and texts describing the fields. The form filling engine also identifies the flow of the electronic form. Accordingly, the form filling engine generates input requests in one-to-one or many-to-one mappings of fields to input requests. One-to-one mappings can be used as a default. However, many-to-one mappings can also be used to group related fields (e.g., ones belonging to a same section, having common subject matter, being of the same type, sharing descriptive text, etc.) in a single input request. The many-to-one mapping can ease the effort of the user in providing an input because the user needs to provide one user response which is then parsed and used to populate multiple fields. For instance, the user's address includes a number, street, city, state, and zip code. A one-to-many mapping allows the user to provide his or her full address at once. That address is then parsed to detect the number, street, city, state, and zip code and accordingly populate the fields of the electronic form. Further, the form filling engine sets each input request as a state of the state machine 320. The form filling engine also sets transitions between the states depending on the flow and depending on user responses. An improper user response results in no transition. A proper user response results in a transition to another state.

In an example, input requests are organized according to the flow of the corresponding fields. Within a same section of the electronic field, the input requests follow the flow of the corresponding fields. If a first field is listed before a second field, a transition is set from the respective first input request to the respective input request. On the other hand, if a first field can be followed by two fields depending on the input to the first field (e.g., the first field is a status field. If married, the first field is followed by a number of dependent fields; otherwise, the next field is an occupation field as illustrated in FIG. 3), transitions from the respective first input request to the respective two input requests are set and are followed depending on the user response. Across two sections of the electronic fields, transitions are set between input requests corresponding to adjoining fields and/or interdependent fields across the two sections. In addition, the form filling engine sets an override mode for using the state machine 320. In this override mode, if the user requests to populate a particular field, the form filling engine allows a transition to an input request corresponding to that particular field regardless of the current state of the state machine 320, thereby providing an override.

In addition to generating the state machine 320, the reformulated electronic form 330 is generated. In an example, the reformulated electronic form 330 includes the various input requests, which correspond to the states of the state machine 320. Each input request can be formulated as a question or an instruction that provides guidance to the user. Each input request includes, for example, the label of the field and the text describing the field and is formulated according to the type of the field. In an illustration, if a field is a radio field, the respective input request describes the exclusively selectable options. If a field is a text field, the respective input request asks for an alphanumeric entry. If a field is a comb field, the respective input request allows, in a single user response, entries to the different sub-fields forming the comb field. If a field is a checkbox field, the respective input request describes the checkable options. If a field is a signature field, the input request describes any disclaimer, asks the user to type in a name, to say a name, or to use a biometric signature (e.g. a finger print, a retinal scan, a face recognition).

In the illustrative example of FIG. 3, the electronic form includes three sections. Two fields are in the first section: a first name field and a last name field. Both fields are text fields. In the second sections, a radio field asks the user whether he or she is married. If married, the user is asked to input the number of dependents in a comb field of the second section. In the third section, a text field is provided to input the occupation of the user.

Accordingly, the state machine 320 maps the five fields to four states, each of which correspond to an input request. The first state corresponds to a name which groups the first name and second name fields of the electronic from. That state can be transitioned to a status state based on a proper user input (e.g., one that includes non-numeric text). The status state correspond to the status radio field. Only a selection between married and unmarried allows a transition to a next state. Depending on the selection, the next state can be a number of dependents state (e.g., if the user answers with a "married" status) or an occupation state (e.g., if the user answers with a "unmarried" status). The number of dependents state corresponds to the number of dependents comb field. In comparison, the occupation state corresponds to the occupation text field. A transition also exists between the number of dependent states to the occupation state.

As also illustrated in FIG. 3, the reformulated electronic form 330 includes four input requests corresponding to the four states. The first input request asks the user about his or her full name. The user response thereto is parsed to identify the first name and the last name and accordingly populate the first name and last name fields of the electronic form. The second input request includes a question whether the user is married. If the answer is no, the user is automatically assumed to be unmarried. The status radio field is accordingly selected in the electronic form. The third input request asks the user about his or her number of dependents. That input request is only presented to the user if the user answers with a married status in response to the second input request. The fourth input request asks the user about his or her occupation.

In an example, the guided presentation initially presents the first input request. Based on the user response and the state machine 320, the second input request is then presented. Similarly, based on whether the user answers as being married or unmarried, the third or fourth input request is presented given the transitions defined in the state machine 320. As explained above, an override mode is also available. As such, if the user responds to the first input request with a command to fill out the occupation field, the presentations of the second and third input requests are skipped. Instead, the fourth input request is presented.

Hence, by reformulating an electronic form into a set of input requests and by mapping the electronic form to a state machine, a guided presentation is possible. In a way, the state machine provides a workflow for presenting the input requests based on how the electronic form is organized and on the user responses. Each of the input requests guides the user to provide a user response.

While FIG. 3 illustrates using a state machine to reformulate the electronic form into a set of input requests and interact with the set of input requests, other types of machine can be similarly implemented. For example, a Turing machine is additionally or alternatively used. In another example, a machine learning algorithm is implemented to analyze the electronic form and user information and output the set of input requests and guided presentation. Electronic forms of the same or different type and/or format of a current electronic form and a history of user interactions with such electronic forms are used to train the machine learning algorithm.

Turning to FIGS. 4-7, the figures illustrate example flows for filling out an electronic form based on a guided presentation. In the illustrative operations, each of the operations or functions may be embodied in, and fully or partially automated by, modules executed by one or more processors of a computing system. An example computing system is further illustrated in FIG. 8. In the interest of clarity of explanation, the computing system is described as performing the illustrative operations. Nevertheless, one of ordinary skill in the art would appreciate that the computing system can execute one more modules, such as a form filling engine, a form presentation tool, and/or other modules, to implement one or more of the operations and/or one or more steps of the operations. Additionally, while the operations are illustrated in a particular order, it should be understood that no particular order is necessary and that one or more operations can be omitted, skipped, and/or reordered.

Figure 4:
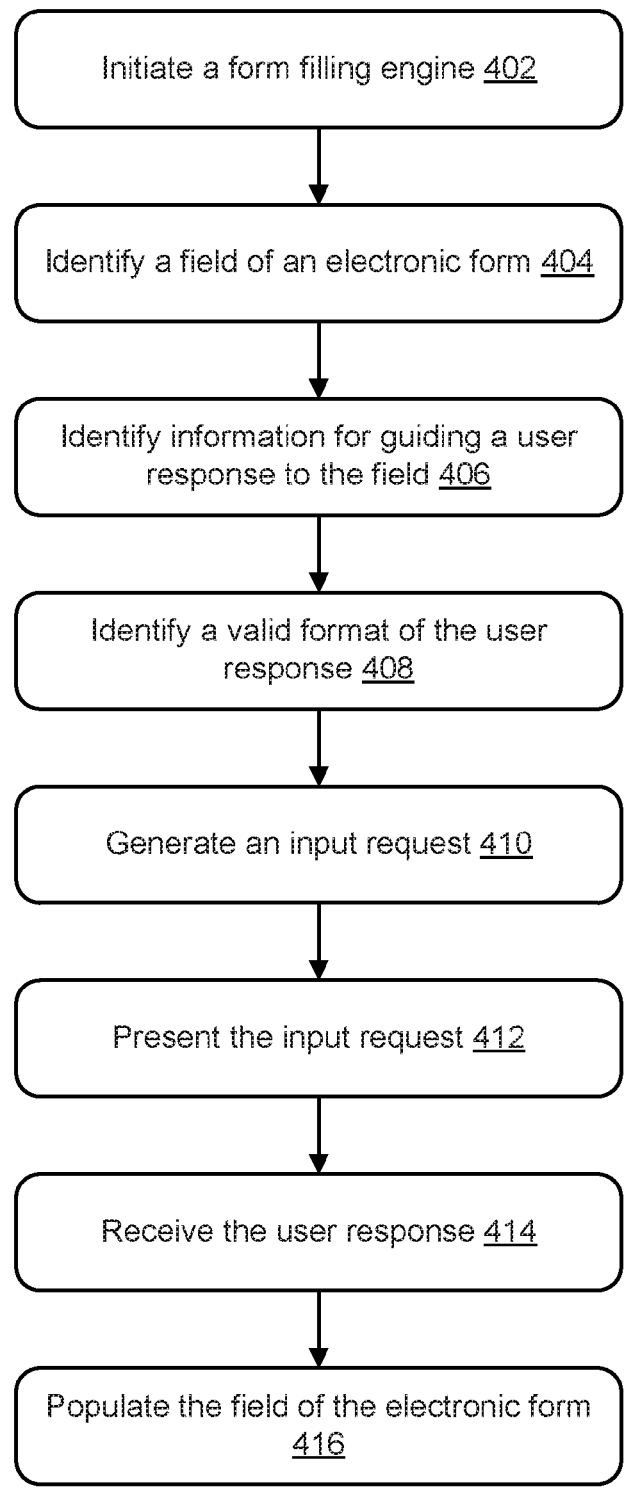
FIG. 4 illustrates an example flow for processing an electronic form to generate a guided presentation and filling out the electronic form based on the guided presentation, according to certain embodiments of the present invention.
Figure 5:
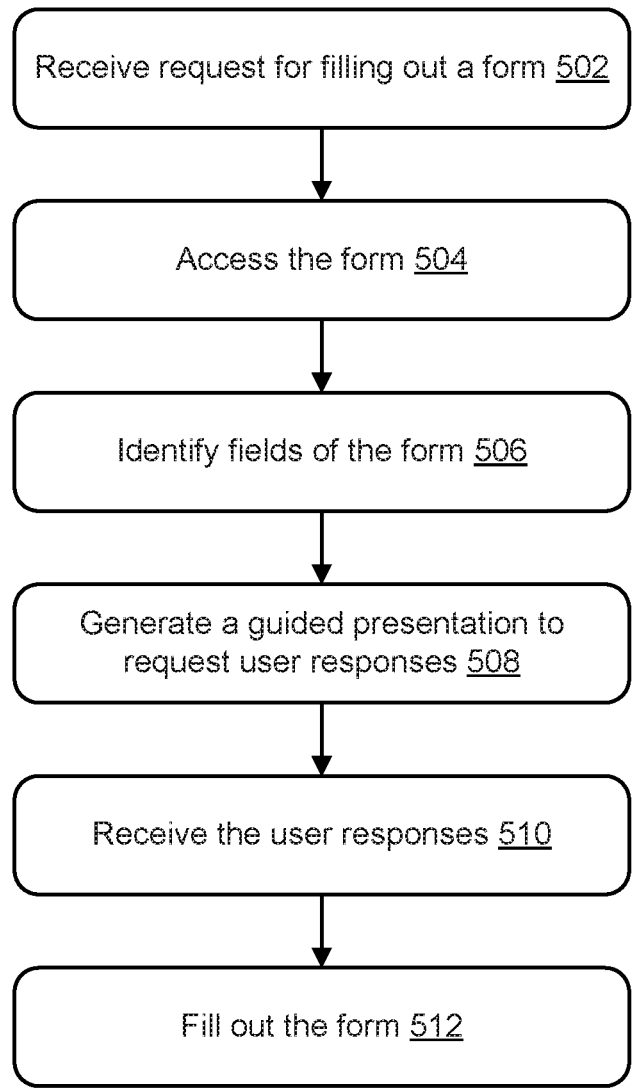
FIG. 5 illustrates an example flow for filling out an electronic form based on a guided presentation, according to certain embodiments of the present invention.
Figure 6:
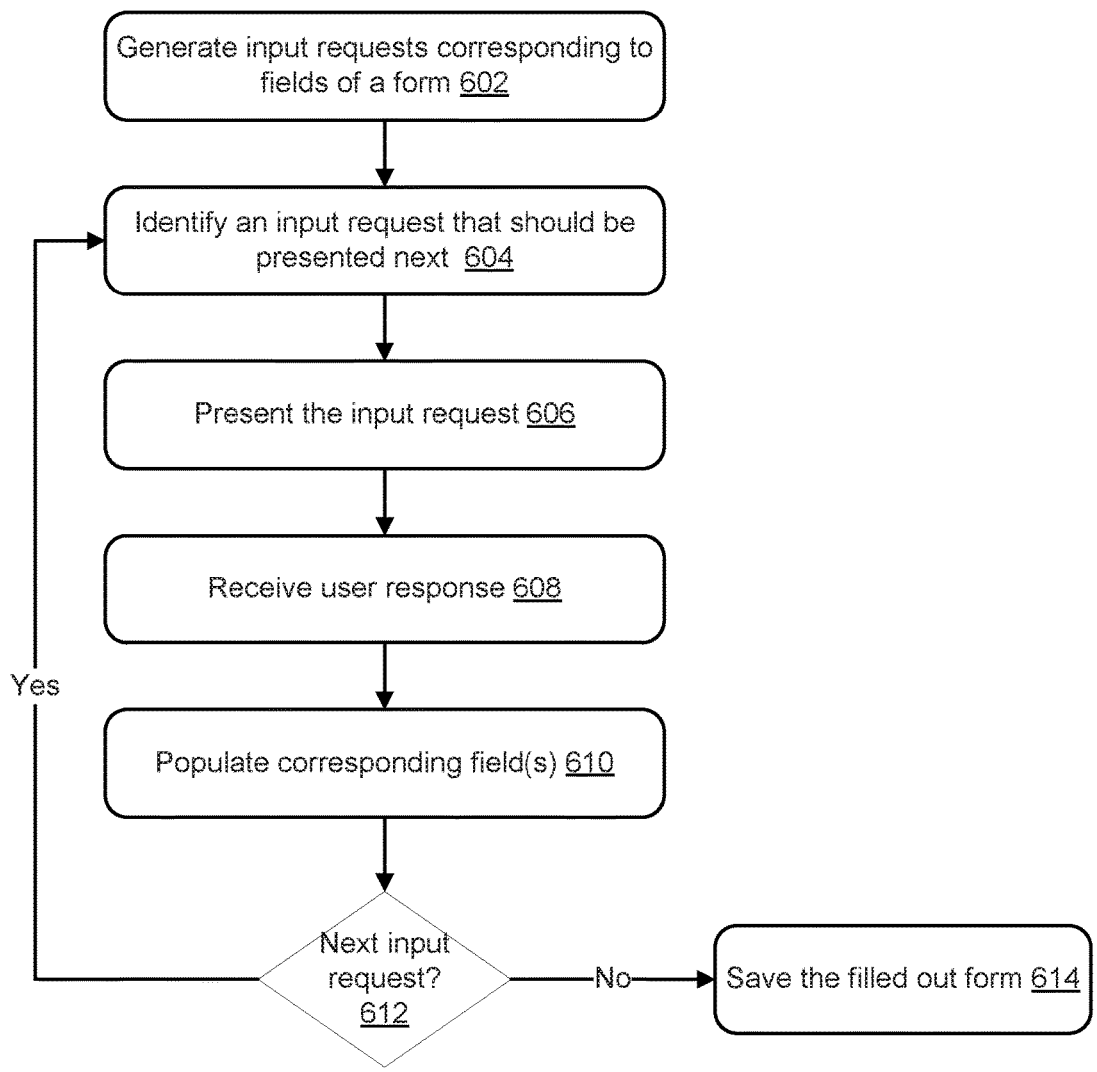
FIG. 6 illustrates an example flow for filling out an electronic form based on input requests and user responses, according to certain embodiments of the present invention.
Figure 7:
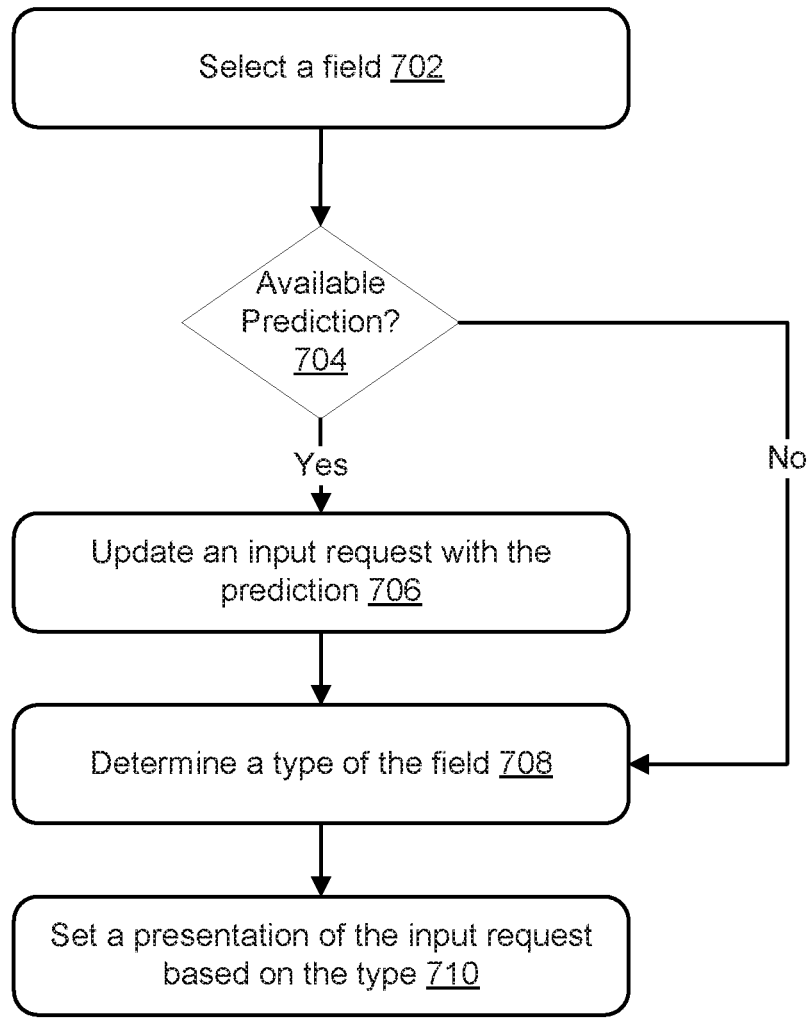
FIG. 7 illustrates an example flow for presenting input requests based on types of fields of an electronic form, according to certain embodiments of the present invention.

FIG. 4 illustrates an example overall flow for processing an electronic form to generate a guided presentation and filling out the electronic form based on the guided presentation Operations of the example flow of FIG. 4 may be further embodied in operations of example flows of FIGS. 5-7. As such, some operations of the example flows of FIGS. 4-7 may be similar. Such similarities are not repeated herein in the interest of clarity of explanation. FIG. 5 illustrates an example flow for filling out the electronic form. FIG. 6 illustrates an example flow for interactively filling out the electronic form based on input requests and user responses. The input requests are provided as part of the guided presentation. FIG. 7 illustrates an example flow for presenting the input requests based on types of fields of the electronic form.

Turning to FIG. 4, the illustrated example flow starts at operation 402, where a form filling engine is initiated. The form filling engine is configured to assist the user with completing an electronic form. In an example, the computing system initiates the form filling engine based on a trigger event. Various trigger events are usable. An example trigger event includes a user request to fill out the electronic form. Another example trigger event is condition-based. For instance, once the electronic form becomes available from a resource or is downloaded to a user device, the computing system automatically (e.g., absent user input) initiates the form filling engine.

At operation 404, a field of the electronic form is identified. For example, the form filling engine identifies the field based on an analysis of the electronic form. The analysis includes identifying the field, a label associated with the field, text (e.g., descriptive text) associated with the field, and a type of the field as described in connection with FIG. 1. Different types of analysis are usable based on the type of the electronic form. For instance, if the electronic form is structured, the form filling engine identifies the field from the structure of the electronic form. On the other hand, if the electronic form is unstructured, the form filling engine processes the electronic form (e.g., applies image recognition techniques, OCR, etc.) to identify the field.

At operation 406, information for guiding a user response to the field is identified. For example, the form filling engine identifies the information based on the label and/or text associated with the field. The form filling engine uses the information to generate an input request. For instance, the input request includes the label and/or the test. As such, if the label is "first name" and the text is "insert from your driver's license," the form filling engine sets the information to include "insert first name from your driver's license." In turn, the input request would include such information.

At operation 408, a valid format of the user response is identified. For example, the form filling engine identifies the valid format based on the type of the field. For instance, if the type is a text field, the valid format includes a free form text. In comparison, if the type is a check box, the valid format is a "yes" or "no" (or some other Boolean format).

At operation 410, the input request is generated. For example, the form filling engine generates the input request on the information for guiding the user response and the valid format of the user response. For instance, the form filling engine includes the information in the input request, associates the valid format with the input request, and sets a presentation of the input request to present the information according to the valid format. As such, and referring back to the first name illustrative example, the form filling engine generates an input request to ask the user to "insert first name from your driver's license." If the user response does not meet the associated valid format, the form filling engine invalidates the user response and requests an alternate user input. An example flow for validating the user response is further illustrated in FIG. 6.

At operation 412, the input request is presented. For example, the form filling engine presents the input request to the user via the user device. Different presentation modalities are usable and include, for instance, visual, audible, and/or touch presentations.

At operation 414, the user response is received. For example, the form filling engine receives the user response, where the user response is sent from the computing device in response to the presentation of the input request.

At operation 416, the field of the electronic form is populated. For example, the form filling engine populates the field with data from the user response. Operations 404-416 can be repeated until an exit event. The exit event results in the form filling engine terminating the workflow for populating the fields of the electronic form and saving the populated data and the electronic form. An example exit event includes a user input requesting the exit. Another example exit event includes the various fields being populated.

Turning to FIG. 5, the illustrated example flow starts at operation 502 where a request is received to fill out an electronic form. For example, the computing system receives the request from a client. The client transmits the request to the computing system based on input of a user. The request identifies and, optionally, includes the electronic form.

At operation 504, the electronic form is accessed. For example, the computing system retrieves the electronic form from local storage or a remote source based on the fill-out request. In another example, the computing system receives the electronic form from the client.

At operation 506, the fields of the electronic form are identified. In an example, the identification includes determining the type, label, and descriptive text of the field. The identification depends on whether the electronic form is structured or unstructured. If structured, the computing system identifies the fields from the structure of the electronic form. Otherwise, the computing system implements OCR and pattern recognition techniques for the identification. In an example, the computing system analyzes the electronic form to detect text, lines, and images. Patterns of vertical, horizontal, and curved lines are further detected. These patterns are matched to fields and types of fields. In an illustration, intersections between horizontal and vertical lines along with text within the intersection area represent a text field. A circular pattern of lines represent a radio field. A long horizontal line with short intersecting vertical lines represent a comb field. In addition, the computing system determines the location of the detected text relative to the fields. Text that is closer to a particular field relative to other fields is associated with the particular field and is set as the descriptive text. Further, the computing system analyzes the text associated with each field to identify a label of the field. For instance, this identification uses the location of the text relative to the field and the length of the text. Short text that is the closest to the field or that is within the field is set as the label.

At operation 508, a guided presentation to request user responses associated with filling out the form is generated. For example, the guided presentation includes input requests and is organized based on the flow of the electronic form. The computing system generates the input requests from the identified fields. The computing system also generates a state machine from the flow and the fields and organizes the guided presentation (e.g., the order of presenting the input requests) based on the state machine. FIG. 6 further illustrates an example flow for generating the input requests and the state machine. The computing system provides the guided presentation to the client for presentation thereat using different types of input/output modalities.

At operation 510, the user responses are received. For example, the computing system receives a user response from the client in response to an input request presented at the client. Each user response is used to identify and present a next input request based on the state machine and so and so forth. Presenting input requests and receiving corresponding user responses represent a guided dialog.

At operation 512, the electronic form is filled out. For example, the computing system parses a user response to an input request. Data from the user response is then used to populate the field(s) corresponding to the input request.

The guided presentation includes a plurality of input requests. In an example, the input requests are presented one at a time at the client. The presentation can be dynamic in a sense that what input request to present next depends on what input request is currently presented and the user response thereto. This dynamicity is provided based on the state machine and is further illustrated in FIG. 6.

In particular, FIG. 6 illustrates an example flow for presenting an input request and, based on the user response, identifying and presenting a next input request. This dependency on the user responses allows an interactive back and forth dialog to fill out the electronic form.

The example flow of FIG. 6 starts at operation 602, where input requests corresponding to fields of the electronic form are generated. For example, the computing system generates the input requests from the identified fields. The computing system uses a one-to-one and/or a many-to-one mapping between fields and input requests. The mapping depends on a degree of association between the fields. In other words, two or more fields are mapped to a same input request if such fields have a particular association. Otherwise, the fields are mapped to different input requests. The computing system uses various parameters to measure the degree of association between fields. These parameters include whether the fields belong to a same section, have a common subject matter, are of the same type, and/or share descriptive text. In an illustration, two fields that belong to a personal information section, ask for a first name and last name, necessitate text input, and have descriptive text about user personal information are found to be associated at a high degree. Accordingly, the computing system maps these two fields to a same input request, such as one that asks for a full name. In comparison, two fields that belong to different sections (e.g., personal information and hobby section) and that are of different types (e.g., one being a text field and the other being a radio field) are found to have a low degree of association. The computing system maps these two fields to two respective input requests.

As such, each input request includes a label and a descriptive text of at least one field. Further, the computing system formulates the input request based on the type of the field(s). For example, if the field is a radio field, the input request lists the selectable options. In comparison, if the field is a text field, the input request allows a freeform text input.

At operation 604, an input request to be presented next at the client is identified. The identification can be based on the state machine corresponding to the electronic form. In an example, the state machine provides an interactive workflow for presenting the input requests. This workflow organizes the presentation of the input requests in a dynamic order that depends on the flow of the electronic form and the user responses. If the user has not previously filled out any portion of the electronic form, the computing system selects the first state from the state machine and identifies the corresponding input request as the one to be presented. On the other hand, if some portion was previously filled out, the computing system identifies the last used state, the last user response, selects the next state based on the state machine, and identifies the input request corresponding to the next state. In addition, if the user requests a specific field to be filled out, the computing system identifies the input request corresponding to that field.

In an example, the computing system generates the state machine from the electronic flow. The fields (or, conversely, the corresponding input requests) are mapped to the states of the state machine. The flow of the fields within the electronic form define the transitions between the states. If the electronic form has a structure, the flow is detected from the structure. Otherwise, the flow is detected from the layout of the different fields within the electronic form (e.g., relative locations to each other, types of the fields, what sections the fields belong to, etc.) and from the subject matter of the descriptive texts (e.g., whether filling out one field depends on filling out another field).

At operation 606, the identified input request is presented. For example, the computing system transmits the input request to the client. In turn, the client presents the input request to the user at a user interface. At operation 608, a user response to the input request is received. For example, the user provides the user response at the user interface. The client transmits the input request to the computing system.

At operation 610, the field(s) corresponding to the input request are populated. For example, the computing system parses the user response to identify different elements thereof. If the input request corresponds to a single field, the elements are used as inputs to the field. Otherwise, the elements are mapped to the different fields and each element is inputted to the corresponding field.

The mapping can use different techniques. In one example technique, the mapping matches the type of a field to the type of an element. For instance, if the input request asks for a name and a Social Security number, the alphabetic characters are matched to a name field and the numeric characters are matched to a Social Security number field. In another example technique, the mapping matches a subject matter of a field to the subject matter of an element. For instance, if the input request asks for a name and a birth month, the elements are compared to the months of the year. An element that matches a month is inputted to the birth month field. The remaining element(s) are inputted to the name field. In yet another example technique, the matching uses an order of the elements. For instance, the input request asks the user to state his or her first name followed by the last name. As such, the first element and the second element from the user response are inputted to the first name field and the second name field, respectively.

In an example, the computing system also validates the user response. If invalid, the field(s) are not populated. Instead, the input request is presented again to the user as further described at operation 612. The computing system uses different validation techniques. Some of the validation techniques can be similar to the above mapping techniques. For example, the validation techniques use the types, subject matters, and/or orders of the field(s) and the element(s) of the user response. If the field type and the element type do not match, the user response is invalid. Similarly, if there is a subject matter mismatch, the user response is invalid. Likewise, if the input request asks for a particular number of elements but the user responses includes a different number, the difference indicates an order mismatch and, thus, the user response is invalid.

At operation 612, a determination is made as to whether a next input request should be presented. For example, the computing system inputs the user response to the state machine to determine a transition to the next state. If no next state exists, the computing system determines that all of the fields of the electronic form have been populated. Accordingly, operation 614 is followed to save the electronic form. Otherwise, operation 604 is followed to identify the next state for presentation. Here, the next state can be the same current state if the user response is improper. In such a case, the current input request is presented again to the user with a reason explaining that the user response was improper. On the other hand, if the user response is proper, the next state corresponds to a different input request that is then presented to the user.

FIG. 7 illustrates an example flow for presenting an input request. Briefly, the presentation depends on the type of the corresponding field(s). Further, the presentation can be optimized by predicting a user response and adding the prediction to the input request.

In particular, the example flow of FIG. 7 starts at operation 702 where a field is selected. For example, the computing system selects the field as one corresponding to the input request. At operation 704, a determination is made as to whether a prediction associated with the field exists. In an example, the prediction includes a potential response, or set of potential responses. The computing system makes the determination by using different parameters. These parameters include a history of the user and/or of other users filling out copies of the electronic form or of other electronic forms and a profile of the user. In an illustration, if the user has previously filled out a copy of the electronic form, the computing system predicts the user response from the respective populated field of the copy. In another illustration, if the user has filled out other electronic forms, the computing system looks up a similar field in the other electronic forms. A similar field includes, for example, a populated field that has the same label, descriptive texts, type, etc., as the field of the current electronic form. The computing system predicts the user response from this populated field. Similar predictions are also made based on other users. In particular, another user (or a group of other users) can be selected for the prediction based on a common attribute with the user. The attribute can relate to the field. For instance, if the field is about a salary, the other user is selected as one having a same occupation as the user. In a further illustration, the user can have a profile at an application hosted on the computing system (e.g., with a form filling engine) or on the client (e.g., with a form presentation tool or more generic to the client itself). The profile includes personal information that is usable for the prediction. For example, if the field is about the name of the user, such information is predicted from the profile. If the prediction is available, operation 706 is performed to update the input request; otherwise, operation 708 is performed to determine a type of the field, which in turn is used to present the input request.

At operation 706, the input request is updated with the prediction. For example, the computing system includes the prediction and, optionally, the prediction parameter in the input request. As such, each input request includes information about the prediction in addition to the label and descriptive text of the field. In that way, the user need not be requested to provide much information in the user response, thereby easing the user's effort. Instead, the user is asked to confirm or select from the prediction. Only if the user response revokes the prediction that the user is requested to provide the correct information.

Generally, there are different types of prediction. One example type corresponds to an automatic fill mode. In this mode, the top candidate prediction is selected and presented to the user. That can be the case when there is sufficient separation in confidence between the top choice and the alternatives. If the user rejects top candidate, the user is asked to provide the necessary information in the response to fill out the electronic form or, alternatively, the next top candidate is presented to the user (e.g., as an in a smart fill mode). Another example type corresponds to the smart fill mode. In this mode, the predictions are ranked and are presented as choices to the user based on the ranking. The user responds by selecting one of the choices.

At operation 708, a type of the field is determined. For example, the computing system determines the type when the field is identified. As described in connection with FIG. 5, if the electronic form is structured, the type is identified from the structure; otherwise, the type is identified from an OCR and pattern recognition analysis of the electronic form.

At operation 710, a presentation of the input request is set based on the type of the field. For example, the computing system formulates the input request to solicit a user response that is proper for the type of the field. In an illustration, if the field is a radio field, the input request is set to present the selectable options and to ask the user to choose one of these options. If a field is a text field, the input request is set to ask for an alphanumeric entry that accepts a freeform input from the user. If a field is a comb field, the input request is set to allow entries in a single user response to the sub-fields forming the comb field. If a field is a checkbox field, the input request is set to present the checkable options and to ask the user to check the proper ones. If a field is a signature field, the input request is set to present any disclaimer and to ask the user to type in a name, say a name, or use a biometric signature (e.g. a finger print, a retinal scan, a face recognition).

In addition to the type of the field, the presentation of the input request is also or alternatively set based on the potential user response (e.g., based on an applicable prediction) under operation 710. Generally, there are distinct possibilities of the potential user response. These possibilities include, for example, (1) no potential clues to the answer are known, (2) there is a single guided suggestion which exists, (3) there are well-defined set of guided possibilities, and (4) there is a set of guided possibilities which may or may not be used in the response. In the first possibility, there are no information based on the user's profile or past history of entering form data due to either lack of prior knowledge or prevention of doing so based on security concerns (e.g., four digits on back of credit card). This leads to soliciting a "free-form" response. The field of the electronic form is populated by interpreting the user's response. In the second possibility, a single response to a field (e.g., date of birth) could have been stored. The user is presented with confirmation of the expected response. If the user rejects the expected response, again a "free-form" response is used. In the third possibility, a radio field can provide several choices, one of which should be selected (e.g., Gender: 'male' or 'female'); a pull-down field with several pre-populated options also follows this model. By very nature of such fields, the possibility of a free-form response is precluded. Instead, the different options are presented to the user with a request to select one of these options. In the fourth possibility, a text field could have produced more than one answer in the past but does not necessarily preclude a new and unique answer. In this case, the various answers (past and potential future answers) are presented to the user for a selection (e.g., "I see have used two contact answers in the past "800-555-1234" and "888-555-0000; which is the best contact number or do you prefer a new contact number?").

Figure 8:
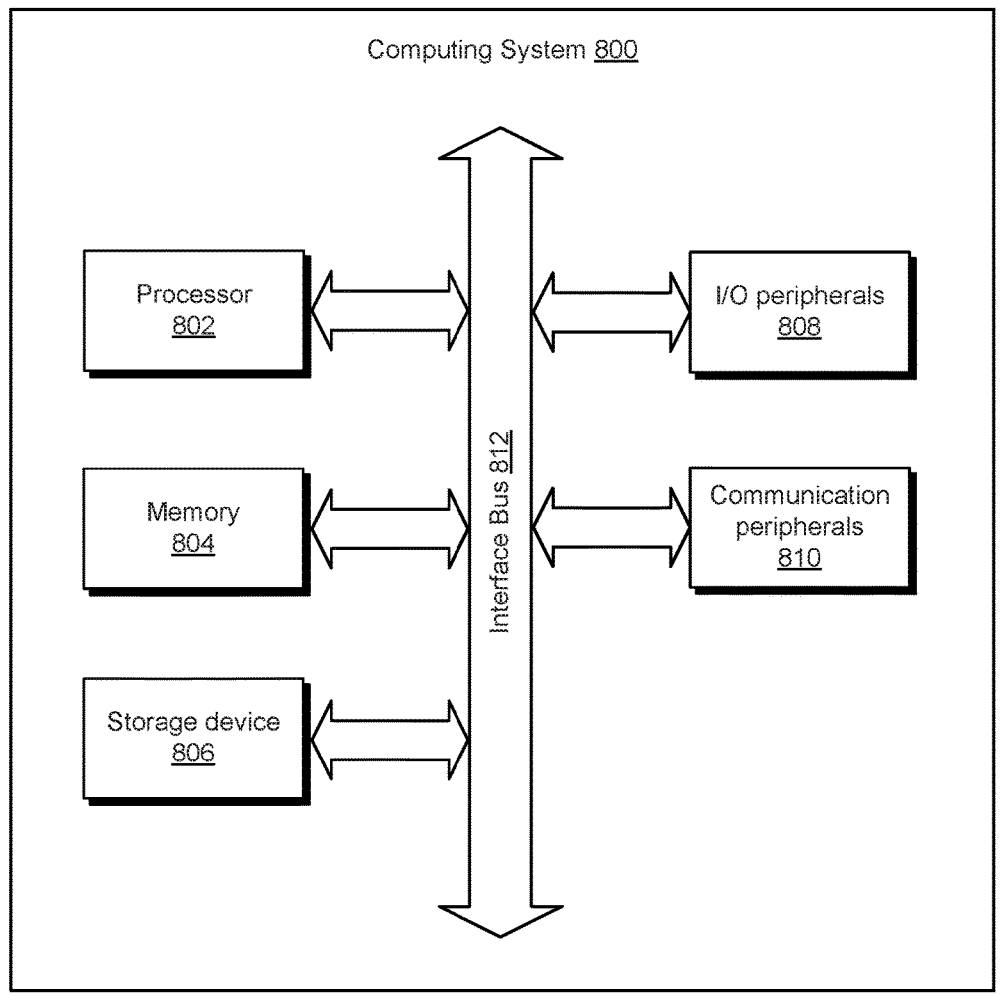
FIG. 8 illustrates example components of a computing system, according to certain embodiments of the present invention.

Turning to FIG. 8, the figure illustrates example components for implementing some or all of the components of the server 120 and/or the client 110 of FIG. 1. Although the components are illustrated as belonging to a same computing system 800, this system can be distributed.

The computing system 800 includes at least a processor 802, a memory 804, a storage device 806, input/output peripherals 808, communication peripherals 810, and an interface bus 812. The interface bus 812 is configured to communicate, transmit, and transfer data, controls, and commands among the various components of the computing system 800. The memory 804 and the storage device 806 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a datacenter. The input and output peripherals 808 includes user interfaces such as a keyboard, screen, microphone, speaker, other input/output devices, and computing components such as graphical processing units, serial ports, parallel ports, universal serial bus, and other input/output peripherals. The input/output peripherals 808 are connected to the processor 802 through any of the ports coupled to the interface bus 812. The communication peripherals 810 are configured to facilitate communication between the computing system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may" "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for assisting a user with completing an electronic form, the computer-implemented method comprising:
   generating, after receiving a request of the user to fill out the electronic form, a state machine based on a structure of the electronic form by at least:
      determining whether the structure of the electronic form comprises an explicit field or an implicit field;
      if the structure comprises the explicit field, mapping the explicit field to a state of the state machine; and
      if the structure comprises the implicit field, recognizing the implicit field based on an optical character recognition and mapping the implicit field to a state of the state machine;
   initiating a form filling engine to assist the user with completing the electronic form;
   identifying, by the form filling engine, a field of the electronic form, wherein the field corresponds to the state of the state machine;
   identifying, by the form filling engine, information for guiding a user response to the field based on at least one of: a label associated with the field or text associated with the field;
   identifying, by the form filling engine, a valid format of the user response based on a type of the field;
   generating, by the form filling engine, an input request based on the information for guiding the user response and the valid format of the user response;
   presenting, by the form filling engine, the input request via the user device, wherein the input request is presented separately from the electronic form;
   receiving, by the form filling engine from the user device, the user response for populating the field in response to the input request, wherein the user response causes a transition to another state of the state machine corresponding to another field of the electronic form; and populating, by the form filling engine, the field of the electronic form with data from the user response.

2. The computer-implemented method of claim 1, further comprising:
generating, by the form filling engine, a second input request for a second field of the electronic form;
determining, by the form filling engine, an order for presenting the input request and the second input request; and
presenting, by the form filling engine, the second input request via the user device based on the order, wherein the second input request is presented separately from the input request and from the electronic form.

3. The computer-implemented method of claim 1, further comprising:
identifying, by the form filling engine, a second field of the electronic form; and
determining, by the form filling engine, an association between the field and the second field, wherein the input request further requests input to the second field based on the association, wherein the presenting presents the input request as a single input request for the field and the second field, wherein the form filling engine is configured to accept the user response as a single input to the field and the second field, and wherein the second field is populated with the data from the user response.

4. The computer-implemented method of claim 1, wherein the presenting of the input request comprises at least one of: a graphical presentation, audio presentation, or touch presentation, wherein the form filling engine is hosted on the user device and is configured to present the input request without presenting the field of the electronic form in association with requesting the user response.

5. The computer-implemented method of claim 1, wherein the input request comprises a potential user response, wherein the potential user response is based on at least one of: a user profile associated with an application, a user profile associated with the user device, a user access to the user device, or a history of responses to electronic forms of the user or of other users, and wherein the user response comprises at least one of: selection from multiple potential user responses, a confirmation of the potential user response or an update to the potential user response.

6. The computer-implemented method of claim 1, wherein the field of the electronic form comprises a radio field or a checkbox, wherein the input request identifies pre-defined user responses in the electronic form for the radio field or the checkbox.

7. The computer-implemented method of claim 1, wherein the field of the electronic form comprises a signature field, wherein the input request comprises a signature disclaimer of the electronic form, and wherein the valid format for the user response comprises at least one of: a typed signature, a voice signature, an identifier of a stored signature, or a unique identifier of the user.

8. The computer-implemented method of claim 1, wherein the field of the electronic form comprises a text field, wherein the input request comprises a potential user response, and wherein the valid format for the user response comprises at least one of: a confirmation of the potential user response or an update to the potential user response.

9. The computer-implemented method of claim 1, wherein the field of the electronic form comprises a text field, wherein the valid format for the user response comprises a freeform input.

10. The computer-implemented method of claim 1, further comprising:
validating, by an application, the user response based on the data from the user response and the valid format for the user response,
wherein the field is populated based on the user response being validated.

11. The computer-implemented method of claim 1, wherein the field is the explicit field of the electronic form, and wherein populating the field comprises inputting the data in the explicit field.

12. The computer-implemented method of claim 1, wherein the field is the implicit field of the electronic form, and wherein populating the field comprises:
storing the data as metadata; and
associating the metadata with the implicit field.

13. A system comprising:
a processor;
a memory communicatively coupled to the processor and bearing instructions that, upon execution by the processor, cause the system to at least:
receive a request to fill out an electronic form from a user device;
generate, after receiving the request, a state machine based on a structure of the electronic form by at least:
determining whether the structure of the electronic form comprises an explicit field or an implicit field;
if the structure comprises the explicit field, mapping the explicit field to a state of the state machine; and
if the structure comprises the implicit field, recognizing the implicit field based on an optical character recognition and mapping the implicit field to a state of the state machine;
initiate a form filling engine based on the request;
identify, by the form filling engine, fields of the electronic form;
identify, by the form filling engine, an order to present the fields via the user device, the order identified based on an organization of the fields in the electronic form and on the state machine;
identify, by the form filling engine, information for guiding a user response to a field of the fields based on text associated with the field, wherein the field corresponds to the state of the state machine;
identify, by the form filling engine, a valid format of the user response based on a type of the field;
generate, by the form filling engine, an input request based on the information for guiding the user response and the valid format of the user response;
provide, by the form filling engine, the input request to the user device for presentation, wherein the input request is presented separately from the electronic form and based on the order to present the fields;
receive, by the form filling engine from the user device, the user response for populating the field in response to the input request, wherein the user response causes a transition to another state of the state machine corresponding to another field of the electronic form; and
fill out, by the form filling engine, the field of the electronic form with data from the user response.

14. The system of claim 13, wherein generating the state machine comprises:
mapping the field to the state of the state machine;

determining a label of the field, the type of the field, and text associated with the field;

generating the input request for the field based on the label, the type, and the text;

storing the input request in association with the state;

determining a degree of association of the field with a different field of the electronic form; and determining whether to map the different field of the electronic form to the state of the state machine based on the degree of association.

15. The system of claim 13, wherein the system is in communication with the user device over a data network, and wherein the request to fill out the electronic form is received from the user device over the data network.

16. The system of claim 13, wherein the request to fill out the electronic form is received at a user interface of the user device, and wherein the input request is generated after receiving the request to fill out the electronic form and is presented at the user interface separately from the electronic form.

17. A non-transitory computer-readable storage medium storing instructions that, when executed on a computing system, configure the computing system to perform operations comprising:

generating, after receiving a request of a user to fill out an electronic form, a state machine based on a structure of the electronic form by at least:

determining whether the structure of the electronic form comprises an explicit field or an implicit field;

if the structure comprises the explicit field, mapping the explicit field to a state of the state machine; and if the structure comprises the implicit field, recognizing the implicit field based on an optical character recognition and mapping the implicit field to a state of the state machine;

initiating a form filling engine to assist the user with completing the electronic form;

identifying a field of the electronic form, wherein the field corresponds to the state of the state machine;

identifying, by the form filling engine, information for guiding a user response to the field based on text associated with the field;

identifying, by the form filling engine, a valid format of the user response based on a type of the field;

generating, by the form filling engine, an input request for requesting an input to the field, wherein the input request is generated based on the information for guiding the user response and the valid format of the user response, and wherein the input request is generated for presentation in lieu of the electronic form in association with requesting the input to the field;

presenting, by the form filling engine, the input request via a user device, wherein the input request is presented separately from the electronic form;

receiving, by the form filling engine from the user device, the user response for populating the field in response to the input request, wherein the user response causes a transition to another state of the state machine corresponding to another field of the electronic form; and populating, by the form filling engine, the field of the electronic form with data from the user response.

18. The non-transitory computer-readable storage medium of claim 17, wherein the input request is generated based on the state machine associated with the electronic form, and wherein fields of the electronic form are not predefined by the computing system.

19. The non-transitory computer-readable storage medium of claim 17, wherein the input request is generated based on the type of the field, a label of the field, and the text associated with the field, wherein the instructions when executed on the computing system further configure the computing system to perform operations comprising:

identifying a second field of the electronic form;

generating a second input request corresponding to the second field;

determining an order for presenting the field and the second field; and causing a one-at-a-time presentation of the field and the second field based on the order.

\* \* \* \* \*